US005557278A

United States Patent [19]
Piccirillo et al.

[11] Patent Number: 5,557,278
[45] Date of Patent: Sep. 17, 1996

[54] AIRPORT INTEGRATED HAZARD RESPONSE APPARATUS

[75] Inventors: Bart J. Piccirillo, Mt. Caramel; Marshall Watnick, Trumbull; Raymond M. Kruczek, Guilford, all of Conn.

[73] Assignee: Northrop Grumman Corporation, Los Angeles, Calif.

[21] Appl. No.: 494,119

[22] Filed: Jun. 23, 1995

[51] Int. Cl.$^6$ ........................................ G01S 13/87
[52] U.S. Cl. ........................ 342/29; 342/32; 342/36; 342/37
[58] Field of Search ...................... 342/29, 30, 32, 342/36, 37

[56] References Cited

U.S. PATENT DOCUMENTS

| | | | |
|---|---|---|---|
| 3,599,143 | 8/1971 | Brown et al. | 340/958 |
| 3,872,474 | 3/1975 | Levine | 342/36 |
| 3,971,025 | 7/1976 | Levine | 342/410 |
| 4,481,516 | 11/1984 | Michelotti | 340/933 |
| 4,516,125 | 5/1985 | Schwab et al. | 342/36 |
| 5,097,268 | 3/1992 | Bauer, Jr. et al. | 342/160 |
| 5,300,933 | 4/1994 | Discenza et al. | 342/36 |
| 5,334,982 | 8/1994 | Owen | 342/36 |
| 5,374,932 | 12/1994 | Wyschogrod et al. | 342/36 |
| 5,400,031 | 3/1995 | Fitts | 342/36 |

OTHER PUBLICATIONS

"Airport Movement Area Safety System", by M. Watnick and J. Ianniello, United Technologies Norden Systems, Inc., prepared for IEEE/AIAA Digital Avionics Systems Conference, Seattle, WA Oct. 5–8, 1992.

"Airport Surface Collision Warning System Implementation", by J. Ianniello, R. Kruczek, United Technologies Norden Systems, Inc. presented at IEEE/AIAA Digital Avionics Systems Conference and Technical Display, Fort Worth, TX, Oct. 25–28, 1993.

*Primary Examiner*—John B. Sotomayor
*Attorney, Agent, or Firm*—Christopher O. Edwards

[57] ABSTRACT

An apparatus for monitoring the position of multiple objects in a space including a target supervisor, a location supervisor, and a hazard monitoring supervisor. The tracking supervisor receives target data from a sensor, characterizes and tracks selected objects, and provides a target output having multiple features respective of the selected objects. The location supervisor characterizes and displays multiple features in the space, and provides a location output having the aforementioned features therein. The hazard monitoring supervisor detects and responds to a predetermined hazard condition, and provides a detectable notice of such hazard condition, responsive to the target output and the location output. A data logger for selectively retains the target output, the location output, or both. The position monitoring apparatus has six modes: full operation, non-airport-surveillance-radar, isolation, set-up, adaptation, and simulation. An integrator mode is included wherein the target supervisor receives data from a surface detection radar, an airborne surveillance radar, a secondary surveillance radar, a global positioning-system based sensor, a ground-based sensor, or an auxiliary sensor.

33 Claims, 4 Drawing Sheets

AIRPORT INTEGRATED HAZARD RESPONSE APPARATUS

BACKGROUND OF THE INVENTION

This application is related to co-pending patent application Ser. No. 08/494,118, filed Jun. 23, 1995, entitled "Aircraft Landing Determination Apparatus and Method," which is incorporated herein by reference and which is assigned to the same assignee hereof.

1. Field of the Invention

The invention herein regards air traffic control systems, and particularly to air traffic control systems integrating airborne and ground-based target tracking and providing an integrated hazard response.

2. Description of the Prior Art

Accidents involving aircraft and ground vehicles and aircraft ground collisions can occur at busy airports. More than three times as many near-accidents occur on the ground as in the air. In one such accident, an aircraft strayed onto the wrong runway and was struck by a second aircraft, resulting in a loss of life. In another accident, two aircraft collided when one aircraft was cleared to land on an occupied runway. Continuous situation monitoring in fog, snow, at night, and under other adverse conditions, can cause fatigue in human controllers which may lead to a collision between objects on airport surfaces.

Medium-range airport surveillance radar, such as the Automated Radar Terminal System (ARTS) is good for detecting and tracking many aircraft within a large volume of airspace. However, such systems do not provide adequate surveillance coverage for ground-resident objects, including aircraft that are in the taxiing, holding (stopped), takeoff or landing phases of their flight profiles.

Airport surface detection equipment (ASDE) systems can provide high-resolution, short-range, clutter-free, surveillance information on aircraft and ground vehicles, both moving and fixed, located on or near the surface of airport movement and holding areas under all weather and visibility conditions. An ASDE system formats incoming surface detection radar information for a desired coverage area, and presents it to local and ground controllers on high-resolution, bright displays in the airport control tower cab.

However, an ASDE system will be effective only if the controllers are observing the radar display, which may be unlikely during good visibility conditions. The increasing sophistication of electronic equipment in air traffic control towers can result in an increasing number of computer displays and alarms. The large number of displays and keyboards in the tower cab can result in a cramped and cluttered environment which may be relieved by an integrated display apparatus. In addition to ASDE and ARTS systems, other sensor systems such as, for example, secondary surveillance radar (SSR), and global positioning system (GPS) can provide logically disparate parameters in physically disparate locations within the tower cab, further adding to the controllers' burden. The lack of integration between sensor systems in the tower cab, including ARTS, ASDE, SSR, GPS, and the like, can yield gaps in controller awareness of the unfolding situation.

In addition, a large, busy airport is an environment having a vast number of possible conflict situations. In such a dynamic environment, the potential for collision between any given aircraft and any one of possibly many ground-resident, and nearby airborne, objects may not be recognized until it is too late to avoid the collision. Also, the occurrence of a conflict in one area of the airport may draw controllers' attention away from evolving conflict situations.

What is needed is apparatus which can integrate inputs from disparate sensor systems to aid controllers in adverse conditions, such as poor visibility conditions or peak traffic periods, and provide an improved means of detecting and alerting the controller to pending surface conflict.

SUMMARY OF THE INVENTION

The invention herein provides an apparatus for monitoring the position of multiple objects in a predefined space including a target supervisor, a location supervisor, and a hazard monitoring supervisor. The tracking supervisor characterizes and tracks selected objects, receiving target data from at least one sensor. The target supervisor provides a target output having multiple predetermined features respective of the selected objects. The location supervisor characterizes and displays multiple, predetermined features respective of the predefined space, and provides a location output having the aforementioned predetermined features therein. The hazard monitoring supervisor detects and responds to at least one predetermined hazard condition. It provides a detectable notice of such hazard condition, responsive to the target output and the location output. The apparatus can also include a data logger for selectively retaining the target output, the location output, or both.

The target supervisor can include a target collector for extracting at least one target track from the target data, and tracking it over a predetermined period of time. The target supervisor further can include a target manager for determining the predetermined features respective of the selected objects responsive to the target data. The location supervisor can include an adaptation manager for providing selected portions of the predetermined features respective of the predefined space. The hazard monitoring supervisor can include a hazard avoidance manager which can respond to the predetermined hazard condition according to a predetermined selectable set of hazard avoidance logic rules. The hazard monitoring supervisor can also include an alarm manager for determining a manner of presentation of the detectable notice. In addition, the hazard monitoring supervisor can include a situation display manager for providing a visual display, an aural display, or a printed display, responsive to the predetermined hazard condition. The data logger can include an event logger as well as an adaptation logger. The target collector can include a first interface unit between a surface detection radar and the position monitor, and a second interface unit for connection between an airport surveillance radar and the position monitor.

The position monitoring apparatus can have six modes: a full operation mode, a non-airport-surveillance-radar mode, an isolation mode, a set-up mode, an adaptation mode, and a simulation mode. It also can have an integrator mode wherein the target supervisor receives the target data from multiple sensors, at least one sensors being of a type different from a respective other. In this mode, the target supervisor can integrate the disparate target data to provide the target output thereby. Each of the sensors from which the target supervisor can receive data is from the group consisting of a surface detection radar, an airborne surveillance radar, a secondary surveillance radar, a global positioning-system based sensor, a ground-based sensor, and an auxiliary sensor.

Other details, objects, and advantages of the invention will become apparent as the following description of certain present preferred embodiments thereof proceeds. The accompanying drawings show presently preferred embodiments of the invention.

DETAILED DESCRIPTION OF THE PREFERRED EMBODIMENTS

Figure 1:
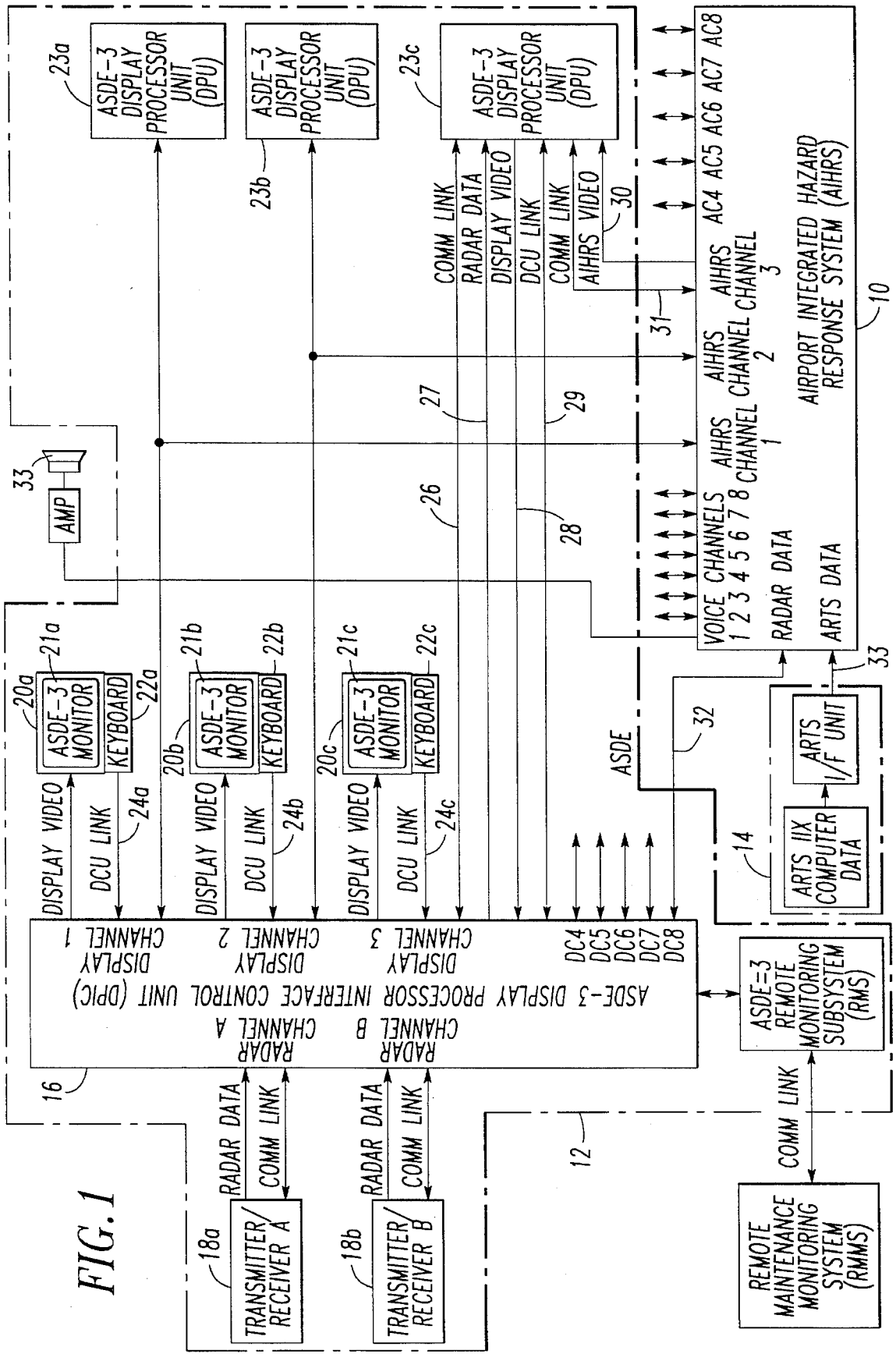
FIG. 1 is an illustration of the functional relationship between an ASDE system, an ARTS system, and the AIHR according to the invention herein.

The invention herein can provide an airport integrated hazard response apparatus (AIHR) and supply controllers with automatic conflict warnings and alerts, enabling them to act swiftly to reduce the incidence of collisions and other runway and taxiway accidents. The AIHR can analyze surface object movements for indications of possible threats, and can automatically alert controllers to inadequate vehicle spacing, inappropriate or unauthorized movements or positioning within the airport area and its associated airspace, and even runway debris. Such objects can include aircraft, trucks, people, animals, and the like. The AIHR can track a preselected number of targets including aircraft on final approach, as well as those that are departing or landing, and objects, including aircraft, that are taxiing or stopped. Targets may be represented as computer-generated symbols, improving display readability.

The AIHR can provide the ASDE-3 or other surveillance display with an overlay of symbology on the display map coordinates covering the entire airport which may be zoomed, windowed, offset, and rotated. This information may also be remotely linked to displays at other locations including in aircraft or vehicles. By zooming in on a particular area of interest, controllers in the tower cab or other observers can see images of planes, ground vehicles, and people on the ground on the radar display consoles. The AIHR can provide position monitoring of a predefined space which can include airport surfaces at the ground and a preselected range of air space thereabove, for example, 200 feet in altitude or 10 miles in range.

The AIHR can utilize information from a number of sources to develop current and projected locations of moving objects compared to defined data surfaces. In addition to surface-based data from an ASDE system, such other sources may include, for example, nearby-airborne-target data from ARTS, tracking data from SSR, absolute spatial location data from GPS devices, and vectored location information from squittering systems. The AIHR provides fusion of disparate sensor data so that controllers can comprehend and respond appropriately to the nature and priority of a plurality of possible hazard situations.

Predicted and actual trajectories of each object are computed and compared with the predicted and actual trajectories of all other objects in a predefined space, which space may include a ground surface and a preselected portion of air space thereabove. Based on information such as the movement state, previous locations, vehicle type and size, surface type, surface status, airport geometry, and the like, AIHR can determine if each moving object exceeds allowable preset limits for each surface, movement state, and surface type and status with respect to other objects. It can also determine if objects remain stationary on surfaces beyond allowed preset limits.

The surface of interest can be divided into predetermined segments so that object locations may be determined relative to those segments. Each segment may, in turn, be divided into a plurality of hazard logic cells, each of which may be analyzed for the existence of a potential conflict. A hazard avoidance manager can analyze the plurality of data inputs to classify an existing situation. The existence of the alert condition can be raised by a comparison of the actual situation with graphical data tables which may contain predefined rules such as, for example, spacing rules based on factors such as surface configuration and the object movement state. These alerts may be used to create voice and display messages or audio/visual alarms, and can control traffic lights, data link messages to operators, and send information to remote master controllers or vehicle operators.

The AIHR can provide visual and aural alarms for runway incursions. Advisories for cautions and warnings involving aircraft, vehicles and obstacles on active runways, approach paths to runways, and intersecting taxiways can be provided. Visual alarms may be provided at each controller position with an ASDE-3 display. A common tower cab aural alarm can be provided via loud speaker in the tower cab. Map editors may be provided in the adaptation manager to define areas of interest, such as runways and intersecting taxiways for which valid sensor data is available. This information can be provided to the hazard monitoring supervisor to detect potentially hazardous situations.

The AIHR can have a display processor which generates display information mixed with information provided to ASDE operational display units (ODU) to provide overlaid video images. In addition, the entry device for AIHR can be the ASDE-3 display control unit (DCU), or a local personal computer or computer workstation platform (collectively, PC platform). AIHR equipment may be kept in the tower equipment room except for a loud speaker and amplifier in the tower cab therefore reducing the amount of equipment required in the tower cab. AIHR can communicate with a plurality of ASDE display channels, for example, eight ASDE display channels.

FIG. 1 illustrates the operation of AIHR 10 in conjunction with ASDE system 12 and ARTS system 14. ASDE system 12 can be of the ASDE-3 type, or system 12 can be another surveillance system, or display system, or both. In general, the ASDE display processor interface control (DPIC) unit 16 can receive data from radar transceivers 18a, 18b. Each of ASDE controller work stations 20a–c can include monitor 21a–c for data display and input devices 22a–c for data entry by controllers. Each of work stations 20a–c can be associated with ASDE display processor unit 23a–c, respectively. DPIC 16 routes display video signals 24a–c to monitors 21a–c from the respective DPU 23a–c. Similarly, DPIC 16 routes controller input receive through DCU link 25a–c to respective DPU 23a–c. Although not shown specifically in conjunction with DPU 23a and 23b, the various signals communicated by DPIC 16 and a DPU are shown with regard to DPU 23c. For example, DPIC 16 and DPU 23c can share communication data along bidirectional communication link 26. Radar data 27 are received by DPU 23c and processed to provide display video 28, which in turn, is routed to ASDE monitor 21c. Controller information input and display control signals are transmitted along DCU link 29 between DPIC 16 and DPU 23*c*. It is possible for AIHR 10 to provide additional display information to the controllers by providing an additional video signal 30 for processing by DPU 23*c* which signal 30 is mixed with other data within DPU 23*c* to form a composite video signal which is transmitted by display video signal 28 to ASDE monitor 21*c* or other display as commanded to the DPIC. Communication between AIHR 10 and DPU 23*c* may be facilitated by bidirectional communication link 31. To provide the radar data necessary for hazard analysis and response, and video input to DPU 23*a–c*, radar signal 32 can be provided to AIHR 10 from DPIC 16. AIHR 10 can also accept data signal 33 from ARTS unit 14 so that radar returns from airborne aircraft can be fused in AIHR 10, processed for safety checks, transmitted to DPU 23*c* via video signal 30 or both, and be routed to DPIC 16 over display video signal 28 for display on monitor 21*c* on workstation 20*c*. AIHR 10 can provide audible signals through audible alarm 33, which signals may include synthesized voice and tone signals. AIHR 10 can work with either ASDE system 12 or ARTS system 14, or both, and with other auxiliary sensor systems.

Figure 2:
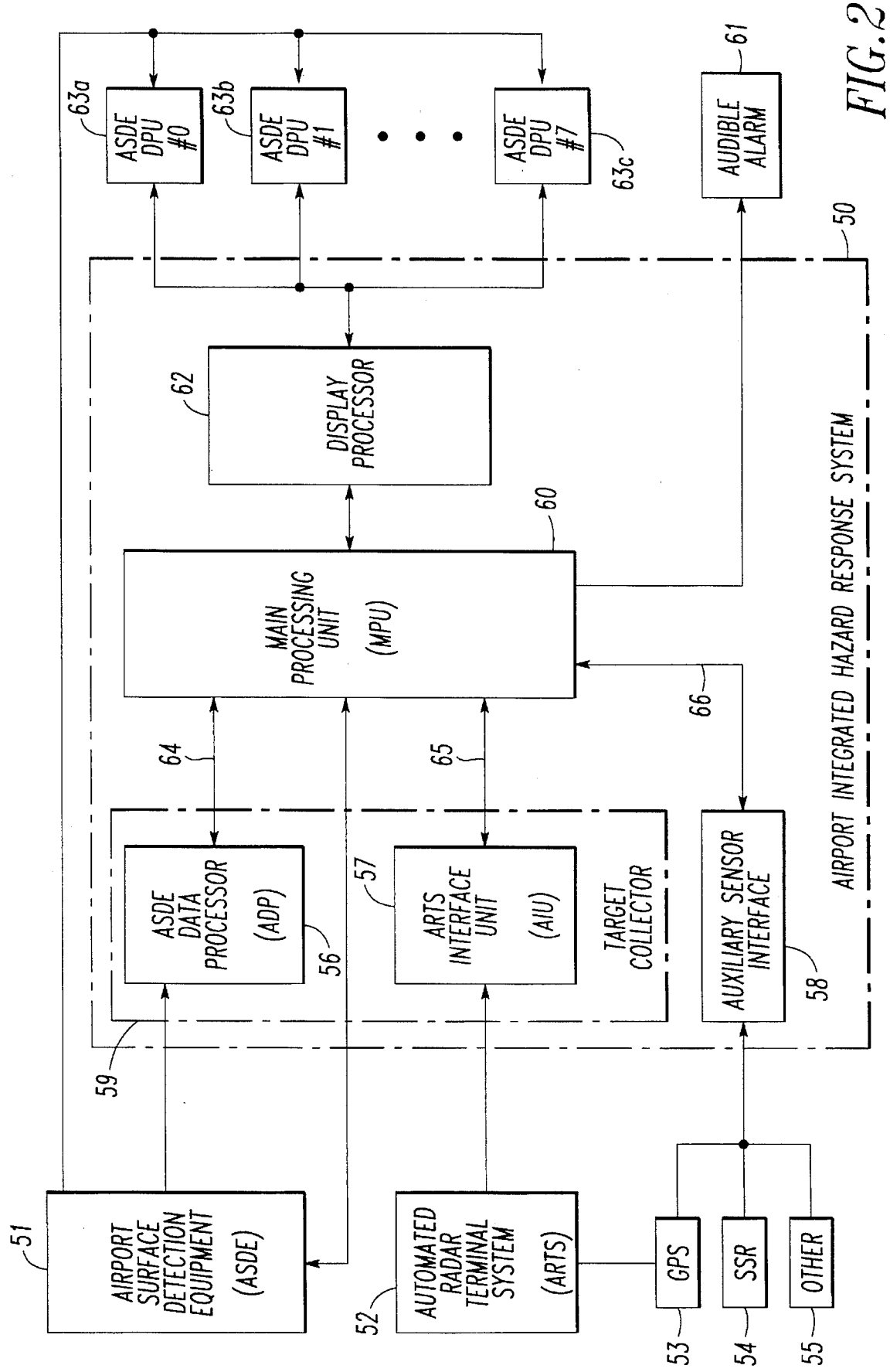
FIG. 2 is a block diagram of one embodiment of the AIHR.

FIG. 2 illustrates one embodiment of an airport integrated response apparatus according to the invention herein. AIHR 50 can collect and fuse data from disparate sensors such as, for example, ASDE system 51, ARTS system 52, GPS sensor 53, SSR sensor 54, and other sensor 55, sensors 53, 54, and 55 being auxiliary sensors. As used herein, the term sensor is inclusive of a particular detector, such as a radar transceiver, and its associated processing equipment; one such sensor being ASDE system 51. Because the data output by the aforementioned sensors may be presented to AIHR 50 at different data rates and in different physical and logical formats, interface units such as ASDE data processor (ADP) 56, ARTS interface unit (AIU) 57, and auxiliary sensor interface 58 can be used to present data to main processing unit (MPU) 60 in a suitable format. Collectively, ADP 56 and AIU 57 can be used, in part, to serve as target collector 59. In addition to acting as an interface to ASDE system 51, ADP 56 can provide additional signal processing for target extraction. ADP 56 may also perform target centroiding and target tracking. Similarly, AIU 57 can filter target data from the airport surveillance radar (ASR), track ASR targets, and provide a bidirectional data link between ASDE system 51 and ARTS system 52. MPU 60 can collect sensor inputs from and provide control and responsive outputs to ADP 56, AIU 57, and interface 58 by way of bidirectional data links 64, 65, and 66, respectively. In addition to sensor fusion, MPU 60 can correlate ASR and ASDE track files, manage target tracking and provide audible alert generation including synthetic voice and audible tone messages using audible alarm 61. MPU 60 can also provide surface monitoring and situation analysis, employing a hazard monitoring supervisor. This supervisor can use selectable, predetermined hazard avoidance rules to determine the nature, probability, and priority of a plurality of possible hazard situations. A built-in self-test may also be incorporated into MPU 60.

Display processor 62 can effect warning symbol generation including hold bars, icons, symbol blinking, and the like. Display processor 62 also acts as the display interface between AIHR 50 and ASDE system 51. Processor 62 formats input for display on ASDE DPU 63*a–c*. MPU 60 can include a PC platform such as a 80486-based personal computer or workstation system, with ADP 56, AIU 57, and interface 58 being connected to the PC platform by way of a MICROBUS channel.

The AIHR 50 can have six modes of operation. First, the full operating mode permits AIHR 50 to operate in conjunction with both the ASDE system 51 and ARTS system 52. This is because separate ASDE and ARTS data extractors 56, 57, respectively, provide data to AIHR 50 for coordination of target data processing.

Second, in the "non-ARTS" mode, the AIHR 50 can be capable of operation without ARTS system 52. In the event that there are no approaching aircraft, or ARTS unit 52 is not operational, the AIHR 50 can continue to process other input information, including ASDE returns, to monitor the position and movement of ground targets.

Third, in the isolation mode, AIHR 50 may be operated separately from ASDE system 51 without affecting the operation of ASDE system 51. In this mode of operation, ASDE system 51 does not rely on AIHR 50 for inputs in data processing or display.

Fourth, the adaptation mode provides a unique setup for each runway traffic flow and each access to each runway, where feasible. Menus can be provided for each runway to specify both configuration and status.

Fifth, the setup mode specifies runway incursion logic parameters and system parameters. These parameters may be entered using the AIHR PC platform. In this mode, the tower staff can select a combination of runways and applicable traffic flows and parameters. The groupings of predefined runway configurations and associated definitions are buildable and selectable via keyboard to facilitate airport reconfiguration.

Sixth, a simulation mode can be provided to perform engineering development and training off line using recorded or scenario data and injected targets via PC platform input devices.

An integrator mode can also be implemented. In this mode, the target supervisor can integrate data from two or more disparate sensors such as, for example, surface detection radar, airborne surveillance radar, secondary surveillance radar, and global positioning system-based sensors, ground-based sensors, and other auxiliary sensors to produce the target output for the target tracker.

The AIHR apparatus can accept and retain both physical and operational runway and taxiway definitions, data separation rules, system parameters, and display alert priority conditions. The runway/taxiway physical data may be set-up upon installation of the apparatus. Separation parameters may be derived for each airport during apparatus testing and validation. Operational configurations and system parameters can be selectable. Alert priorities also can be selectable and may be programmed in software. Furthermore, adaptation runway data may be grouped into user selectable entities.

Figure 3:
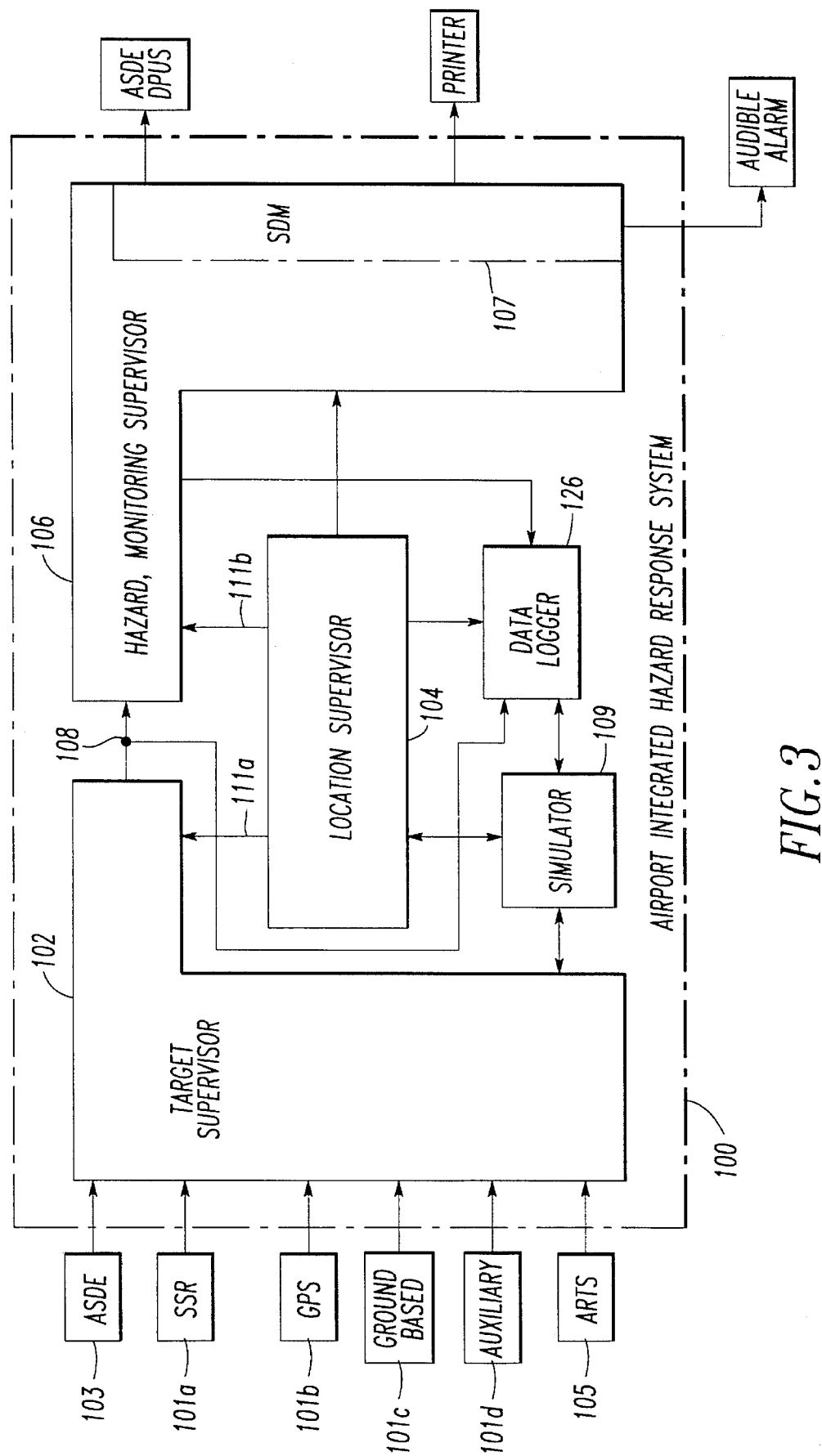
FIG. 3 is a illustration of one embodiment of the functional components of the AIHR.

FIG. 3 present a functional illustration of an AIHR according to one embodiment of the invention herein. AIHR 100 provides an apparatus for monitoring the position of a plurality of objects in a predefined space having target supervisor 102 for characterizing and tracking a selected number of the objects, location supervisor 104 for characterizing and displaying predetermined features respective of the predefined space, and hazard monitoring supervisor 106 for detecting at least one predetermined hazard condition responsive to target supervisor output 108 and location supervisor output 110, and for providing a detectable notice thereof. Hazard monitoring supervisor 106 can include situation display manager 107 for producing and managing the detectable notice which may include visual, aural, and printed notice.

Figure 4:
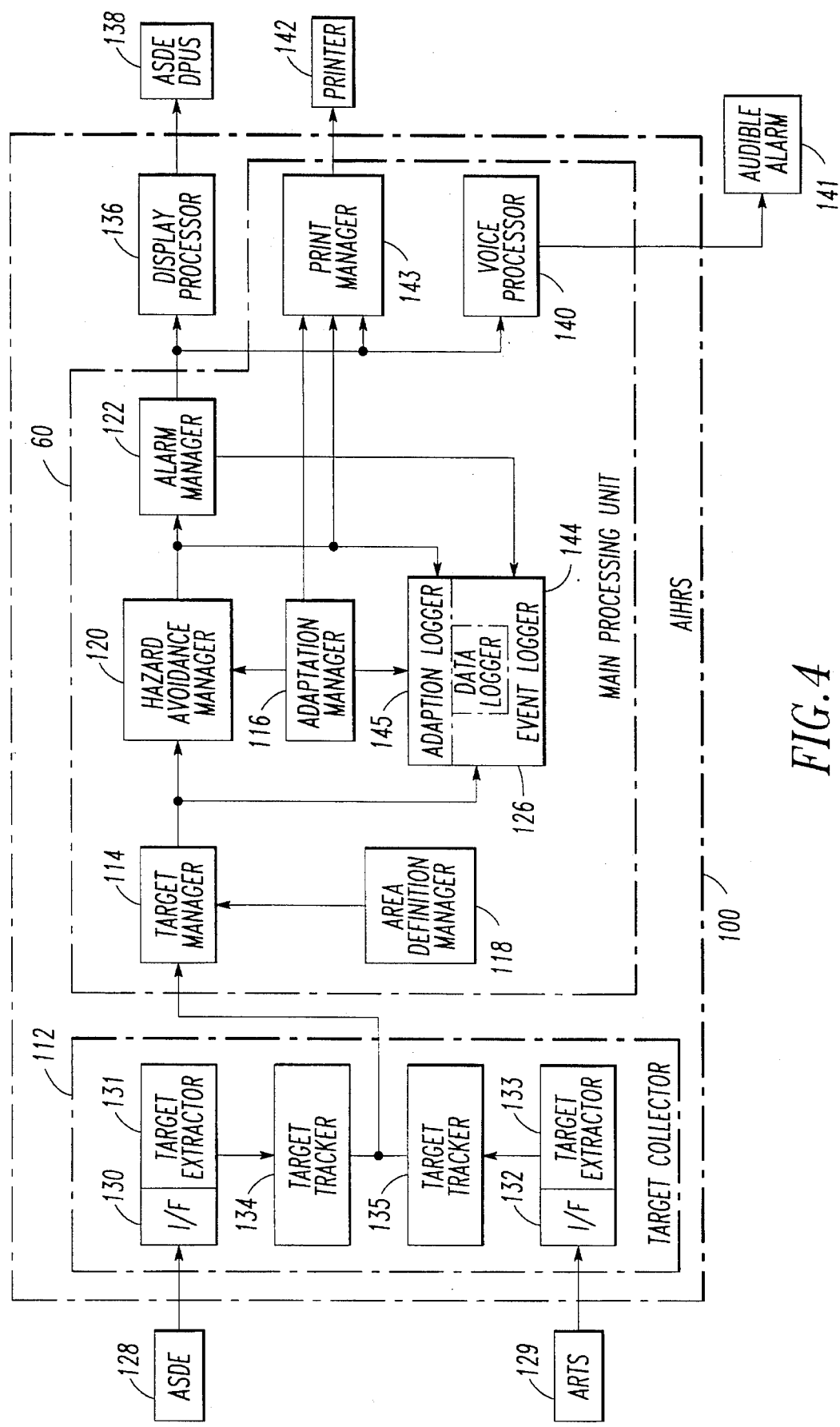
FIG. 4 is a detailed block diagram of the AIHR shown in FIG. 3.

FIG. 4 provides an illustration of AIHR 100 in FIG. 3 respective of a physical layout. Managers 114, 116, 118, 120, 122, and 143, logger 126, and processor 140 may be contained within MPU 60. Target supervisor 102 in FIG. 3 can include target collector 112 and target manager 114, seen in FIG. 4. Location supervisor 104 in FIG. 3 can include adaptation manager 116 and area definition manager 118, seen in FIG. 4. Hazard monitoring supervisor 106 in FIG. 3 can include hazard avoidance manager 120 and alarm manager 122, seen in FIG. 4. AIHR 100 can also include data logger 126 which may include an event logger and an adaptation logger.

Continuing in FIG. 4, target collector 112 can extract and track target information received from at least one of a surface detection object detector 128, which can be for example, an ASDE-3 radar system, and an airborne surveillance detector 129 which can be, for example, an ARTS radar system. Target collector 112 may also provide for synthetic target generation, injection, and playback, accepting target data from simulator 109.

Target collector 112 can extract targets of interest from input sensor data using target extractors 131, 133. Target extractor 131 can include first data interface 130 for extracting information from surface detection sensor 128, and target extractor 133 can have second interface 132 for receiving information from surveillance radar sensor 129. Together with the graphical areas defined by adaptation manager 116, AIHR 100 can acquire and track targets from surface detection and surveillance radar sensors 128, 129, respectively, on runways, taxiways, within intersections, and on approach paths. Extractors 131, 133 can use information such as airport geometry, target geometry, clutter map, and primary and secondary acquisition areas to isolate the targets of interest.

Target trackers 134 can provide a peak amplitude smear from the ASDE radar data to target manager 114. Target manager 114 can have a clutter filter, centroider, and an alpha/beta tracker. The clutter filter provides raw extracted target data to the centroider. The centroider locates the centroid of the extracted image received from the clutter filter. The resultant image centroid can then be provided to the alpha/beta tracker which can be sensitive to both straight-line movement and target maneuvering, and which can provide a next-position estimate and velocity for the target thereby.

Location supervisor 104 may also include an area definition manager 118 to provide selected milieu information therein to target supervisor 102. Included in the milieu information can be the aforementioned clutter map, as well as selected system parameters, predefined constant tables, defined area parameters, and target tracking information. Such system parameters can include Pulse Repetition Frequency (PRF) data from radar, tower height, mode of operation, clutter update frequency, and scale factors. Tabular information can include trigonometric coefficient tables, target ID table, and alpha/beta filter coefficient table. System definitions can include primary and secondary information acquisition areas, and clutter areas. Tracking information can include target status, position, and velocity, as well as selected other tracking parameters.

Area definition manager 118 can also include airport configuration data, and movement/direction parameters in the milieu information. Airport configuration data can include "normal" surface directions, and airport surface types. Movement/direction parameter inputs can include velocity threshold ranges, and travel direction windows. Furthermore, area definition manager 118 can include information such as, for example, surface directions, surface direction codes, surface boundary coordinates, surface intersection coordinates, runway threshold coordinates, and segment data.

Target manager 114 can perform at least seven functions. First, it can maintain target reports from ASDE 128, the playback system, and a synthetic target injection device in target collector 112. Second, target manager 114 can generate target states for use by other components of the system. Third, target manager 114 can compute spatio-temporal parameters such as target velocities and accelerations. Fourth, target manager 114 can determine the current location of targets on airport surfaces. Fifth, target manager 114 can predict the future location of targets on airport surfaces based on information including prior target reports, computed spatio-temporal parameters, and current target locations. Sixth, target manager 114 can provide to display processor 136 target information, such as, for example, target identification, target type, and target position. Seventh, target manager 114 can detect target report anomalies.

Target manager 114, when provided surveillance and surface detection radar information from the first and second interface units, determines directions of movement with respect to movement areas, and classifies targets as either stopped or in one of a predetermined number of movement states. In addition, target manager 114 can predict future target locations based on derivation of velocity and acceleration information from previous position reports. In one embodiment, a second order fit of the previous five position reports can be used.

Target manager 114 can maintain target reports and compute target-related parameters such as, for example, velocities and accelerations. Target manager 114 can also generate target states which may be provided to hazard avoidance manager 120 for analysis. Also, target manager 114 can determine whether targets are on active runways and moving at speeds greater than or less than a selected speed parameter. Movement states may be based in part on detected vehicle speeds.

In general, target manager 114 analyzes and processes information regarding target location, direction, and movement. Target location can be with respect to a predefined position within the selected space, which can include a particular surface in the airport configuration. Target direction can be determined with respect toga particular surface direction.

Target manager 114 can determine target movement by comparing the target's current state with its previous state relative to a movement parameter database to provide the target movement data of interest. Target data can include information from at least one sensor, target identification data, position coordinates, velocity vectors, acceleration, and target state.

Target manager 114 can provide current and predicted target location information which includes the surface(s) on which each target is located as well as the surface type, which is based on the airport configuration. The current and predicted locations of each target can be provided by a particular spatial segment within the airport. In general, target direction can be used to determine whether the target is approaching an intersection, or other targets or objects.

Outputs from the target manager can include target location, target direction, and target movement state. Target location can include the particular surface number upon which the target is located. Target direction can be the states which include a normal direction, an opposite direction, a "in the direction of", a "not in the direction of", and general direction, such as north, east, south, or west. Target movement states can include arrival, landing, departure, departure abort, taxi, and stop.

Simulator 109 can provide synthetic physical objects and tracks, and operational situations including simulated hazard conditions to target supervisor 102, location supervisor 104, and hazard avoidance supervisor 106. Simulator 109 can be used, for example, to inject a selected number of objects, including debris, ground vehicles, aircraft, and the like, into the desired predefined space in the vicinity of the airport, for purposes such as routine and hazard-response training.

Adaptation manager 116 can maintain the plurality of predetermined physical and operational features respective of a predefined space including, for example, spatial configurations of an airport at which the apparatus may be installed. The predetermined features can be maintained as graphical entities which, when used in conjunction with the target manager, can permit AIHR 100 to monitor targets on runways, taxiways, within intersections, on approach paths, and in the nearby airspace. Adaptation manager 116 can also maintain system parameters and support installation and operator data.

Hazard monitoring supervisor 106 can detect at least one predetermined hazard condition responsive to target supervisor 102 and location supervisor 104, as seen in FIG. 3. Hazard monitoring supervisor 103 in FIG. 3 can include hazard avoidance manager 120 which analyzes information received from target manager 114 and from adaptation manager 116. Hazard avoidance manager 120 detects undesirable conditions, or hazards, such as, the incursion of an object into a selected portion of the predefined space which is allocated to another object, such as, for example, an aircraft. In addition, hazard avoidance manager 120 identifies and assigns a priority to an alert condition as provided by a preselected hazard rule set.

Hazard avoidance manager 120 can use preselected parameters for analysis and detection of alert situations. Such parameters can include predetermined target separation parameters, airport configuration, and airborne and ground traffic situations. Separation parameters can include time separations, distance separations, times to intersections, and stop times on surfaces. The airport configuration can be with regard to runway/taxiway geometry, runway usage such as open/close, direction of movement, taxiway, and the like, and segment state such as, segment under repair, snow plowing, maintenance, and the like.

Airborne traffic situation information can include information regarding approaching traffic such as an object's location and an aircraft's landing runway assignment. On the other hand, ground traffic situation can include information regarding moving and stopped traffic or obstructions on surfaces. This can include locating movement, providing movement direction, velocity, and acceleration, and the vehicle state. The spatio-temporal relationship between the two targets, respective of the targets' position in the monitored space can be maintained in a set of hazard avoidance logic tables.

Hazard avoidance manager 120 can also provide target pair analysis by determining the relative positions of the target pair, and performing projection computations using the spatio-temporal parameters of the target pair to predictively select particular, predetermined projection situations which may be indicative of a hazard or alert situation. Such projection situations can include a "chase" situation, where two targets on a single surface are moving in the same direction, a "head-on" situation, where two targets on a single surface are moving towards each other, and a "crossing" situation, where two targets are converging upon each other at an intersection. A no-problem situation can exist when either none of the aforementioned situations exits, or if, after target pair analysis, the target movements are projected to avoid a hazard or alert situation.

Using rules for intersections as delineated in the hazard avoidance logic tables in hazard avoidance manager 120, target manager 114 can determine whether a target is on a taxiway or runway which is intersecting with an active runway and is predicted to enter the taxiway or runway within a preselected number of seconds, determining if an alert is required. Hazard avoidance manager 114 can also assess the situation for landing an approaching aircraft to an active or inactive runway.

Hazard monitoring supervisor in FIG. 3 can include alarm manager 122, seen in FIG. 4, which can maintain the aforementioned alert priorities, can generate video and aural commands, and control the utilization of the alerts. Alert notification can include the use of graphic indicators such as icons around "caution" targets, a flashing icon around "warning" targets, fixed hold bars, moving hold bars, and arts indicator lines. Alert notification may also include the provision of an alert message window required by hazard avoidance manager 120. Audio alerts can also include voice alerts.

Alarm manager 122 can control the alert indications received from hazard avoidance manager 120 through prioritization, message scrolling, video display coordination, and repetitive alert suppression. With alert prioritization, messages may be displayed in priority order based on the alert type, the movement state and the direction of target movement in an alert message window. With selective message scrolling, the five highest priority messages will remain on the display in the alert message window. Messages can remain on queue while the voice alarm alert is active. Those active messages which may have scrolled off of the message window can be redisplayed when the space is available.

Under video display coordination, voice messages may not be interrupted and the display can contain the message. In addition, text messages can remain active on the display while an incursion persists, and for at least as long as the spoken voice alert is provided. Repetitive alerts can be suppressed where subsequent alerts for the same targets and same conditions may not be reissued.

Alarm manager 122 can prioritize multiple alerts. For example, a warning has a higher priority than a caution. A situation involving two targets has a higher priority than one involving one target, for a single target conditions on the runway take priority over conditions on a taxiway. Vehicles moving in a direction opposite to what is considered "normal" for the surface have a higher priority than vehicles moving in the normal direction. Departures, arrivals, and landings have higher priority than taxied or stopped vehicles. Also, new conditions have a higher priority than sequential alerts for the same target. Every message can be assigned an individual priority.

In general, a message processor in alarm manager 122 retrieves alert data from an alert queue, determines the classification and relative priority of the alert, and updates the display target status. Problem targets may be sent to display processor 136. Voice message and alert display messages may be generated with the message content based on alert condition and the associated surface areas involved. Text messages may also be sent to display processor 136. In addition, if there are multiple messages, the message processor processes the next alert in the queue. Also, the message processor handles fresh alerts by cleaning up obsolete alerts.

Situation display manager 107 in FIG. 3 can provide video and aural alert information to the air traffic controllers via ASDE DPUs 138. The visual and aural situation indicia can include, for example, icons, alarm messages, menus, ARTS indicator lines, and fixed and moving hold bars, and are provided to DPUs 138 as video signals which can be transmitted to the ASDE display unit and overlaid upon the ASDE video display.

If an alert condition exists from an approaching aircraft, the alert condition is displayed on the approach to the active runway using an ARTS indicator line. The ARTS indicator line is displayed next to the runway image to indicate the distance from the runway threshold, for example, three miles. Alarm manager 122 can display live target symbols, alert messages, and airport configurations for both live and simulated situations on both the AIHR PC platform and the ASDE-3 displays by way of display processor 136. Alert message positioning on the display can be controlled by the operator.

Hold bars and alerts may be used to indicate the advisability of entering an active runway. Each surface segment may be divided into the preselected number of hazard logic cells for which alerts may be generated or suppressed. A moving hold bar may be placed in front of any targets involved in situations for which such is specified in the hazard logic tables. Fixed hold bars may be displayed at intersections and removed from intersections when the target passes them. Fixed hold bars can be activated along all intersections in front of landing, departing, departure abort aircraft, and approaching aircraft within a selectable distance of the runway threshold.

Situation display manager 107 in FIG. 3 may also contain print manager 143 and voice processor 140, seen in FIG. 4. Print manager 143 can print current adaptation parameters or alternate sets of airport configuration adaptation parameters which are available for selection. Voice processor 140 can generate synthetic voice aural alerts which may be provided in the tower cab separately from the ASDE operational display units. Furthermore, print manager 143 manager can provide a hard copy of a particular situation by generating a printed report.

AIHR 100 can also include data logger 126 which may retain situational information such as, the data pertinent to a particular event, and the data associated with a particular set of features respective of the monitored space, for example, adaptation data. Data logger 126 can have the capability to record all setup data including safety and system parameters, maps, configurations, and clutter maps. It can also record cautions, warnings, controller queues, and target data. This information can be time-tagged whenever an update in an item occurs. Other information such as adaptation conditions, events, and selective area filtering data can be recalled from storage by the operator for future use.

While specific embodiments of practicing the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting to the scope of the invention which is to be given the full breadth of the following claims, and any and all embodiments thereof.

We claim:

1. An apparatus for monitoring the position of a plurality of objects in a predefined space comprising:
   (a) a target supervisor for characterizing and tracking selected ones of said plurality of objects, said target supervisor receiving target data from at least one sensor, said target supervisor providing a target output having a first plurality of predetermined features respective of said selected ones;
   (b) a location supervisor for characterizing and displaying a second plurality of predetermined features respective of said predefined space, said location supervisor providing a location output having said second plurality of predetermined features therein; and
   (c) a hazard monitoring supervisor for detecting and responding to at least one predetermined hazard condition and providing a detectable notice thereof, said hazard monitoring supervisor being responsive to said target output and said location output.

2. The apparatus of claim 1 further comprising a data logger for selectively retaining at least one of said target output and said location output.

3. The apparatus of claim 1 wherein said target supervisor further comprises a target collector for extracting at least one target track from said target data, said target collector tracking said at least one target track over a predetermined period of time.

4. The apparatus of claim 1 wherein said target supervisor further comprises a target manager for determining said first plurality of predetermined features respective of said selected ones responsive to said target data.

5. The apparatus of claim 1 wherein said characterizing and tracking selected ones by said target supervisor includes predicting at least one of said first plurality of predetermined features in said target output.

6. The apparatus of claim 4 wherein said determining by said target manager includes predicting at least one of said first plurality of predetermined features respective of said selected ones responsive to said target data.

7. The apparatus of claim 1 wherein said location supervisor includes an adaptation manager for providing selected portions of said second plurality of predetermined features respective of said predefined space.

8. The apparatus of claim 1 wherein said location supervisor includes an area definition manager for providing selected milieu information.

9. The apparatus of claim 1 wherein said detecting and responding by hazard monitoring supervisor includes projecting a first position of a first target, projecting a second position of a second target, comparing said first position with said second position, and determining a preselected projection situation from said comparing.

10. The apparatus of claim 9 wherein said preselected projection situation includes one of a chase situation and a head-on situation and a crossing situation and a no-problem situation.

11. The apparatus of claim 1 wherein said hazard monitoring supervisor further comprises a hazard avoidance manager, said hazard avoidance manager responding to said at least one predetermined hazard condition according to a predetermined selectable set of hazard avoidance logic rules.

12. The apparatus of claim 10 wherein said hazard monitoring supervisor further comprises a hazard avoidance manager, said at least one predetermined hazard condition including said preselected projection situation, said hazard avoidance manager responding to said at least one predetermined hazard condition according to a predetermined selectable set of hazard avoidance logic rules.

13. The apparatus of claim 1 wherein said hazard monitoring supervisor further comprises an alarm manager for determining a manner of presentation of said detectable notice.

14. The apparatus of claim 1 wherein said hazard monitoring supervisor further comprises a situation display manager for providing at least one of a visual display and an aural display and a printed display, said providing being responsive to said at least one predetermined hazard condition.

15. The apparatus of claim 2 wherein said data logger includes an event logger.

16. The apparatus of claim 2 wherein said data logger includes an adaptation logger.

17. The apparatus of claim 3 wherein said target collector further comprises a first interface unit between a surface detection radar and said target extractor and an second interface unit for connection between an airport surveillance radar and said target extractor.

18. The apparatus of claim 1 having at least one of a full operation mode and a non-airport-surveillance-radar mode and an isolation mode and a set-up mode and an adaptation mode and a simulation mode.

19. The apparatus of claim 1 having an integrator mode wherein said target supervisor receives said target data from a plurality of sensors, at least one sensor of said plurality of sensors being of a type different from a respective other of said plurality of sensors, said target supervisor integrating said target data to provide said target output thereby.

20. The apparatus of claim 19 wherein said at least one sensor is from the group consisting of a surface detection radar and an airborne surveillance radar and a secondary surveillance radar and a global positioning-system based sensor and a ground-based sensor and an auxiliary sensor.

21. The apparatus of claim 19 wherein said respective other is from the group consisting of a surface detection radar and an airborne surveillance radar and a secondary surveillance radar and a global positioning-system based sensor and a ground-based sensor and an auxiliary sensor.

22. The apparatus of claim 1 further comprising a simulator for simulating the presence of a selected number of said plurality of objects in said predefined space, said simulator being connected to said target supervisor, said location supervisor, and said hazard monitoring supervisor.

23. An apparatus for monitoring the position of a plurality of objects in a predefined space comprising:

(a) a target supervisor for characterizing and tracking a selected number of said plurality of objects, said target supervisor receiving target data from at least one sensor, said target supervisor providing a target output having a first plurality of predetermined features respective of said selected ones, said target supervisor having a target collector and a target manager, said target collector for extracting at least one target track from said target data, said target collector tracking said at least one target track over a predetermined period of time, and said target manager for determining said first plurality of predetermined features respective of said selected ones responsive to said target data;

(b) a location supervisor for characterizing and displaying a second plurality of predetermined features respective of said predefined space, said location supervisor providing a location output, said location supervisor having an adaptation manager for providing selected portions of said second plurality to said location output, said location supervisor having an area definition manager for providing selected milieu information, said location supervisor being operably connected to said target supervisor; and (c) a hazard monitoring supervisor for detecting and responding to at least one predetermined hazard condition and providing a detectable notice thereof, said hazard monitoring supervisor being operably connected to said target supervisor and said location supervisor, said hazard monitoring supervisor being responsive to said target output and said location output, said hazard monitoring supervisor having a hazard avoidance manager and an alarm manager and a situation display manager, said hazard avoidance manager responding to said at least one predetermined hazard condition according to a predetermined selectable set of hazard avoidance logic rules, said alarm manager for determining a manner of presentation of said detectable notice, said situation display manager for providing at least one of a visual display and an aural display and a printed display, said providing being responsive to said at least one predetermined hazard condition.

24. The apparatus of claim 23 wherein said characterizing and tracking selected ones by said target supervisor includes predicting at least one of said first plurality of predetermined features in said target output.

25. The apparatus of claim 23 further comprising a data logger for selectively retaining at least one of said first plurality of said target output and said second plurality of said location output, said data logger having an event logger and an adaptation logger.

26. The apparatus of claim 23 having at least one of a full operation mode and a non-airport-surveillance-radar mode and an isolation mode and a set-up mode and an adaptation mode and a simulation mode.

27. The apparatus of claim 23 further comprising a simulator for simulating the presence of a selected number of said plurality of objects in said predefined space, said simulator being connected to said target supervisor, said location supervisor, and said hazard monitoring supervisor.

28. The apparatus of claim 23 having an integrator mode wherein said target supervisor receives said target data from a plurality of sensors, at least one sensor of said plurality of sensors being of a type different from a respective other of said plurality of sensors, said target supervisor integrating said target data to provide said target output thereby.

29. The apparatus of claim 28 wherein said at least one sensor is from the group consisting of a surface detection radar and an airborne surveillance radar and a secondary surveillance radar and a global positioning-system based sensor and a ground-based sensor and an auxiliary sensor.

30. The apparatus of claim 29 wherein said respective other is from the group consisting of a surface detection radar and an airborne surveillance radar and a secondary surveillance radar and a global positioning-system based sensor and a ground-based sensor and an auxiliary sensor.

31. The apparatus of claim 23 wherein said detecting and responding by hazard monitoring supervisor includes projecting a first position of a first target, projecting a second position of a second target, comparing said first position with said second position, and determining a preselected projection situation from said comparing.

32. The apparatus of claim 31 wherein said preselected projection situation includes one of a chase situation and a head-on situation and a crossing situation and a no-problem situation.

33. The apparatus of claim 31 wherein said at least one predetermined hazard condition including said preselected projection situation.

* * * * *